(12) United States Patent
Kishi et al.

(10) Patent No.: US 7,493,699 B2
(45) Date of Patent: *Feb. 24, 2009

(54) INTERCHANGEABLE HORIZONTALLY AND VERTICALLY LASER SUITABLE FOR USE IN SMALL SPACES

(75) Inventors: Keijun Kishi, Yokohama (JP); Brian Kemp, Troy, OH (US); Kent W. Kahle, Tipp City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 10/579,948

(22) PCT Filed: Dec. 2, 2004

(86) PCT No.: PCT/US2004/040273

§ 371 (c)(1), (2), (4) Date: Jan. 3, 2007

(87) PCT Pub. No.: WO2005/057130

PCT Pub. Date: Jun. 23, 2005

(65) Prior Publication Data

US 2007/0214666 A1    Sep. 20, 2007

(51) Int. Cl.
*G01C 1/00* (2006.01)
*G01C 15/00* (2006.01)
(52) U.S. Cl. .................. 33/281; 33/286; 33/DIG. 21
(58) Field of Classification Search ............ 33/281, 33/285–286, 290; 372/103

See application file for complete search history.

(56) References Cited

U.S. PATENT DOCUMENTS

| | | |
|---|---|---|
| 3,815,250 A | 6/1974 | Roodvoets et al. |
| 3,909,952 A | 10/1975 | Lagasse |
| 3,997,267 A | 12/1976 | Met |
| 4,043,679 A | 8/1977 | George et al. |
| 4,053,238 A | 10/1977 | George et al. |
| 4,119,382 A | 10/1978 | George et al. |
| 4,142,798 A | 3/1979 | Barbee, Jr. |
| 4,175,861 A | 11/1979 | Kottas |
| 4,480,942 A | 11/1984 | Farrow |
| 4,714,381 A | 12/1987 | Hatch |
| 4,741,646 A | 5/1988 | Hatch |

(Continued)

FOREIGN PATENT DOCUMENTS

EP    0 341 812 A1    3/1989

(Continued)

OTHER PUBLICATIONS

Laying Pipe with PL 120 an Introduction, 2001, 45 pages, LCI Lasers, Hawthorne, California USA.

*Primary Examiner*—Yaritza Guadalupe-McCall
(74) *Attorney, Agent, or Firm*—Dinsmore & Shohl LLP

(57) ABSTRACT

A laser transmitter adapted for use in small spaces such as pipes and sewers includes a housing having two exit windows positioned in generally orthogonal planes. The laser transmitter includes a leveling mechanism that is capable of directing a collimated beam through a select one of the two exit windows, in a generally horizontal direction at a specified grade irrespective of whether the laser transmitter is oriented generally horizontally or generally vertically.

22 Claims, 7 Drawing Sheets

U.S. PATENT DOCUMENTS

| | | |
|---|---|---|
| 4,993,160 A | 2/1991 | Fraley |
| 5,095,629 A | 3/1992 | Klemer et al. |
| 5,426,507 A | 6/1995 | Rando |
| 5,465,493 A | 11/1995 | Sobottke et al. |
| 5,568,265 A | 10/1996 | Matthews |
| 5,621,531 A | 4/1997 | Van Andel et al. |
| 5,689,330 A | 11/1997 | Gerard et al. |
| 5,829,916 A | 11/1998 | Evans |
| 5,841,527 A | 11/1998 | Shibuya et al. |
| 6,120,209 A | 9/2000 | Evans |
| 6,124,935 A | 9/2000 | Matthews |
| 6,262,801 B1 | 7/2001 | Shibuya et al. |
| 6,286,219 B1 | 9/2001 | Palumbo, II |
| 6,336,770 B1 | 1/2002 | Evans |
| 7,039,089 B2 | 5/2006 | Kishi et al. |
| 7,225,578 B2 * | 6/2007 | Tai .............................. 33/334 |
| 2002/0062570 A1 | 5/2002 | Palumbo, II et al. |
| 2003/0101605 A1 | 6/2003 | Tacklind et al. |
| 2008/0120853 A1 * | 5/2008 | Munroe et al. ................ 33/286 |

FOREIGN PATENT DOCUMENTS

| | | |
|---|---|---|
| EP | 0 699 891 A1 | 3/1996 |
| EP | 1 154 233 A2 | 5/2001 |
| WO | WO 91/02217 | 2/1991 |

* cited by examiner

INTERCHANGEABLE HORIZONTALLY AND VERTICALLY LASER SUITABLE FOR USE IN SMALL SPACES

The present invention relates in general to alignment instruments used in construction, and in particular, to laser transmitters capable of operating while oriented horizontally or vertically, and which are suitable for use in confined spaces.

Reference laser beam systems are used in numerous surveying and construction applications. In one such application, a laser beam transmitter is used as a direction and grade reference during the installation of sewers and other pipes. Basically, a pipe laser provides a stationary, collimated beam of light that is directed axially along the centerline of a pipe installation. The light beam serves as a visual guide in order to maintain individual sections of pipe in a straight line at a particular grade. A laser beam target is typically placed within each new section of pipe being set into place. The target and the new section of pipe are manipulated until the collimated light is centered on the target. Upon centering the target and securing the new section of pipe in position, the target is removed and relocated to the next new section of pipe.

During construction of pipe systems, it is common for a number of manholes to also be installed. Manholes, also referred to interchangeably herein as hubs, are an important aspect of the pipe system. Hubs serve as repair stations for necessary maintenance and upkeep after the pipe system has been installed. Hubs may also be used to collect and reroute sewage, couple pipes of different diameter together, change pipe slope or elevation and reference the line, grade and depth of the pipe.

Pipe sections used for sewers are typically large, generally cylindrical sections of pipe. For example, sewer pipe sections are typically at least six inches (150 millimeters) or larger in diameter. Hubs are typically anywhere from 3-5 feet (91 centimeters to 152 centimeters) in diameter, and may be positioned as deep as 30-40 feet (nine meters to twelve meters) into the ground. However, in certain locations about the world, such as in Japan and Sweden, the diameter of the sewer pipe is being greatly reduced. Also, traditionally large hubs are being replaced by single piece plastic hubs, referred to as clean outs. Unlike traditional hubs, clean outs have an entry diameter of approximately 12 inches (300 millimeters). Comparatively, a typical hub is typically 24-30 inches (600-800 millimeters) in diameter. Due to the space constraints of the clean out and the associated relatively small diameter pipe sections that connect thereto, it is not always possible to orient a typical pipe laser in a clean-out so as to direct the laser beam in a desired direction. This is because pipe lasers are typically long, generally cylindrical devices that cannot be rotated or easily positioned within the confined spaces of the new clean outs. Accordingly, typical pipe lasers cannot be used to lay pipe systems that utilize the smaller clean outs.

The present invention overcomes the disadvantages of previously known devices by providing a drive leveling device for a laser transmitter that retains an accurate level orientation within its housing and can be accurately positioned in at least two orthogonal axes.

According to an embodiment of the present invention, a laser transmitter comprises a housing having a first laser exit window and a second laser exit window. A drive device within the housing is operatively configured to rotatably orient a laser source such that a reference beam from the laser source exits the housing through a select one of the first and second laser exit windows as a collimated laser output beam. The first and second laser exit windows may be oriented with respect to the housing in substantially orthogonal planes for example. Such an arrangement allows the laser transmitter to be used when the housing is oriented both vertically and horizontally. Accordingly, the laser transmitter is suitable for use in small spaces such as pipes and sewers.

According to another embodiment of the present invention, a laser transmitter includes a housing having two exit windows positioned in generally orthogonal planes. The laser transmitter includes a leveling mechanism that is capable of directing a collimated beam through a select one of the two exit windows, in a generally horizontal direction at a specified grade irrespective of whether the laser transmitter is oriented generally horizontally or generally vertically.

The following detailed description of the preferred embodiments of the present invention can be best understood when read in conjunction with the following drawings, where like structure is indicated with like reference numerals, and in which.

Figure 11:
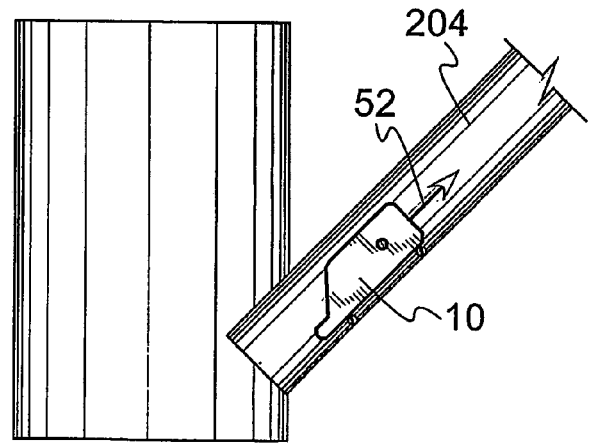
Figure 12:
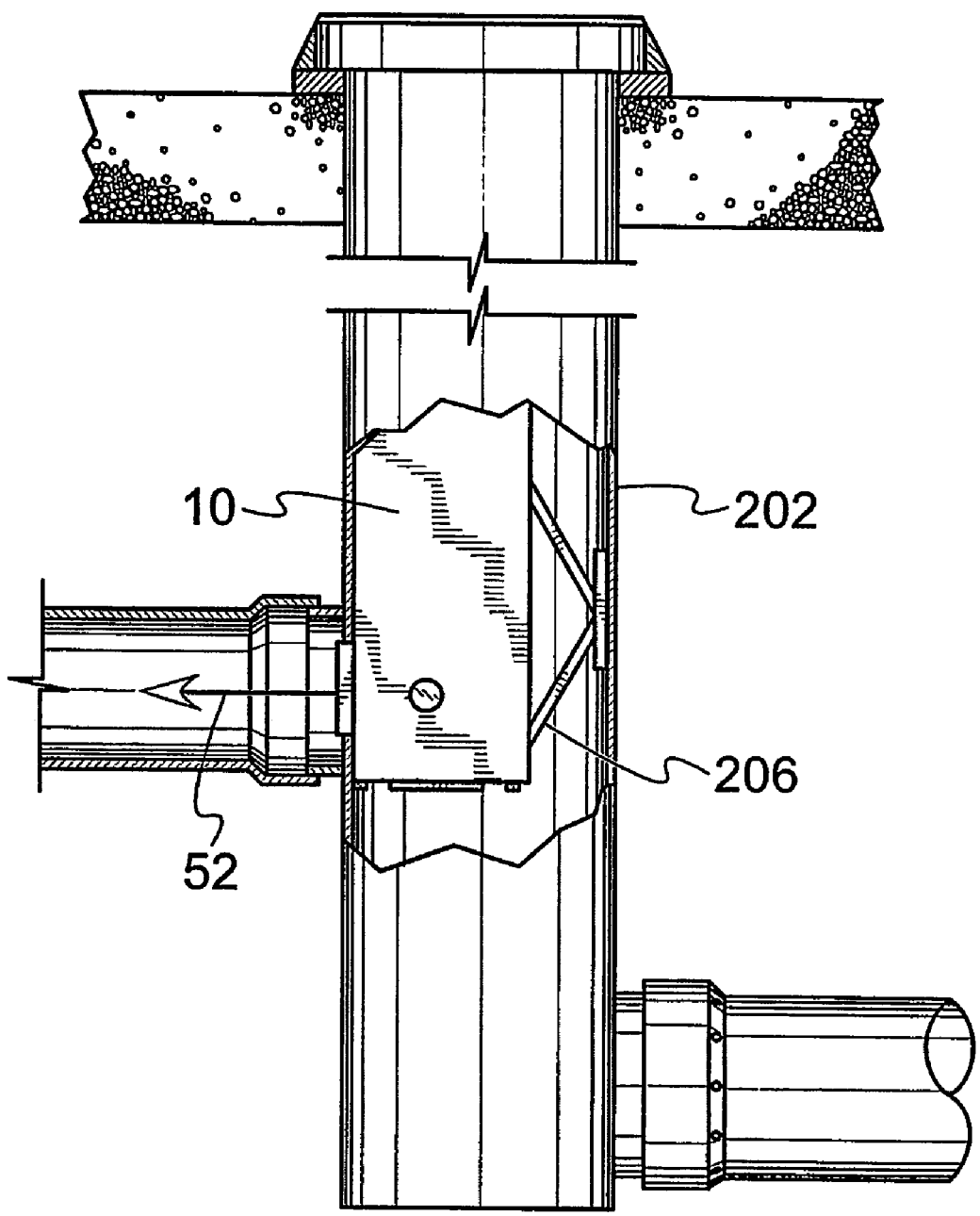

FIG. 11 is a schematic illustration of a laser transmitter according to an embodiment of the present invention in an exemplary application positioned within a pipe near a manhole; and FIG. 12 is a schematic illustration of a laser transmitter according to an embodiment of the present invention positioned in a typical clean-out manhole in cooperation with a pipe section that is not at the bottom of the clean-out.

In the following detailed description of the preferred embodiments, reference is made to the accompanying drawings that form a part hereof, and in which are shown by way of illustration, and not by way of limitation, specific preferred embodiments of the invention. It is to be understood that other embodiments may be utilized and that logical, mechanical and electrical changes may be made without departing from the spirit and scope of the present invention.

Figure 1:
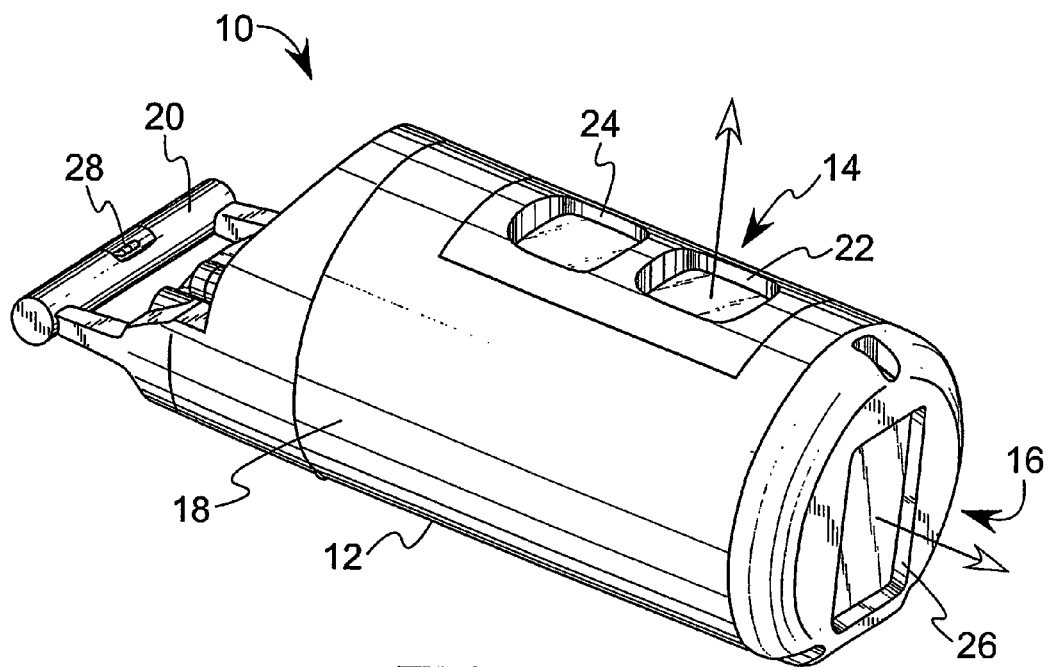
FIG. 1 is a perspective view of a laser transmitter according to an embodiment of the present invention illustrating an exemplary layout for multiple laser exit windows therein.
Figure 2:
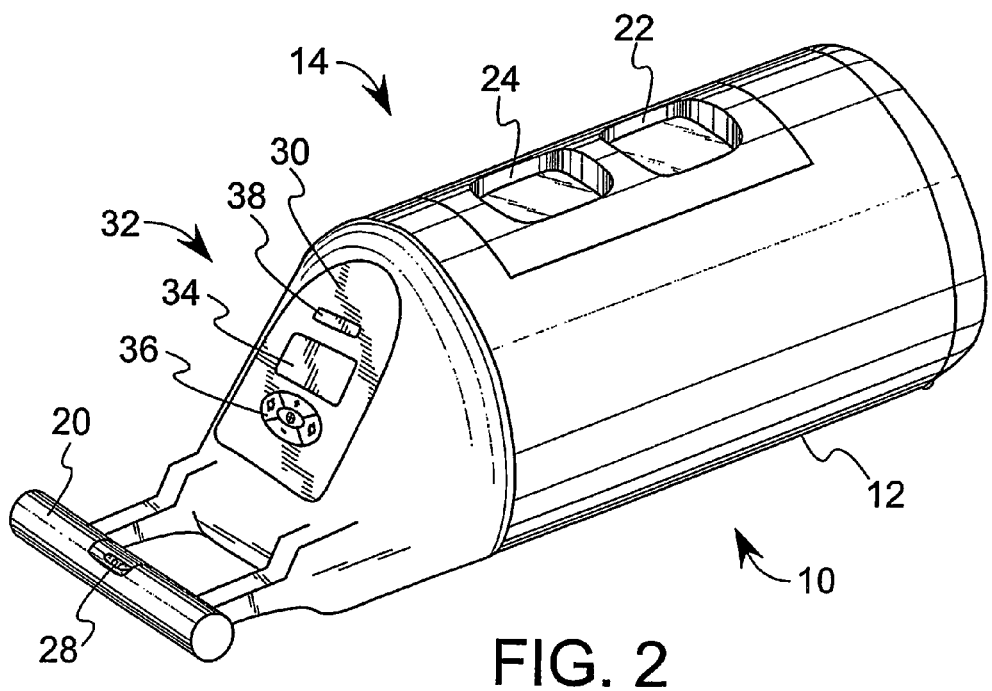
FIG. 2 is a perspective view of the laser transmitter according to FIG. 1 illustrating exemplary operational controls provided on the laser transmitter.

Referring to FIGS. 1 and 2, an exemplary laser transmitter 10 according to an embodiment of the present invention is illustrated. The laser transmitter 10 includes a housing 12 that preferably provides at least some degree of protection from sewage effluents, debris from excavating and other hazards associated with construction sites. As shown, the housing 12 is generally cylindrical and includes a top face 14, a front face 16, a body portion 18 and a handle portion 20. The top face 14 includes a first laser exit window 22 for passing a reference beam of laser light therethrough when the laser transmitter 10 is oriented for a vertical mode of operation. The top face 16 also optionally includes a first communications window 24 for receiving wireless communications from an external device. For example, the first communications window 24 may be configured to receive infrared signals from a remote programming device when the laser transmitter 10 is being used in the horizontal mode of operation. The front face 16 includes a second laser exit window 26 for passing the reference beam of laser light therethrough when the laser transmitter 10 is oriented for a horizontal mode of operation. As shown, the first and second laser exit windows 22, 26 are positioned in generally orthogonal planes.

A level 28 is provided in the handle portion 20 of the housing 12. The level 28 can be a conventional bubble level, or any other leveling device, and may alternatively be positioned about other parts of the housing 12. Referring to FIG. 2, the housing 12 further comprises a back face 30 that includes one or more operational controls 32. For example, as shown, the operational controls 32 may include a display area 34 and an input section 36. The display area 34 conveys information to users concerning the operational parameters of the laser transmitter. For example, the display 34 area may visually convey that the laser transmitter 10 is set to a selected grade, that the laser transmitter 10 is properly set up for operation, etc. The display 34 is preferably large enough that a user can read the display from a distance. For example, the laser transmitter may be positioned within a manhole, and a user may need to read information from the laser from a position outside the manhole. The back face 30 may also include a second communications window 38 for receiving wireless communications from an external device. The second communications window 38 is optional, but may be convenient, for example, when operating the laser transmitter 10 in the vertical mode of operation with an infrared remote programming device.

Figure 3:
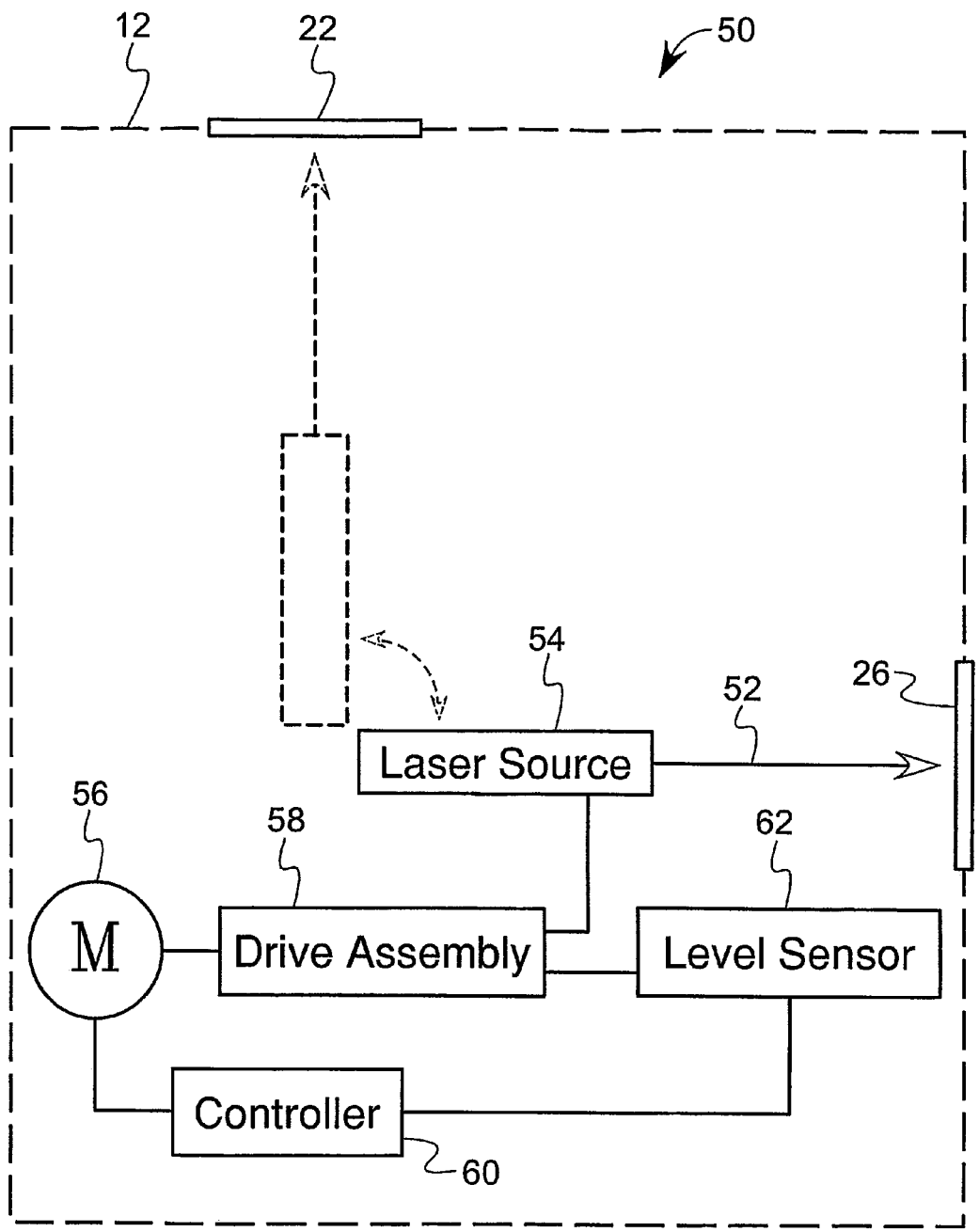
FIG. 3 is a block diagram illustrating a portion of a laser assembly according to an embodiment of the present invention.

The laser transmitter 10, according to an embodiment of the present invention, includes a single laser that can be repositioned for operation in either of the horizontal or vertical modes of operation. Referring to FIG. 3, a laser assembly 50 according to an embodiment of the present invention is illustrated. The laser assembly 50 allows a user to re-orient a reference beam 52 of laser light from a laser source 54 so as to exit the housing 12 through a select one of the first and second laser exit windows 22, 26 as a collimated beam. A drive device 56 such as one or more motors, and optional drive assembly 58, such as an assembly of gears, sprockets, cogs, belts, pulleys and/or other mechanical coupling devices are provided to selectively pivot the laser source 54 within the housing 12 such that the reference beam 52 of laser light is directed out a select one of the first and second laser exit windows 22, 26. Preferably, the reference beam 52 may be adjustably directed out through a select one of the laser exit windows 22, 26 in two dimensions so as to allow for the selection of a desired grade and/or for side-to-side redirection of the reference beam 52. A controller 60 is used to gather information from one or more level sensors 62 and is operatively arranged to control the drive device 56 for pivoting or otherwise transitioning the laser source 54.

Figure 4:
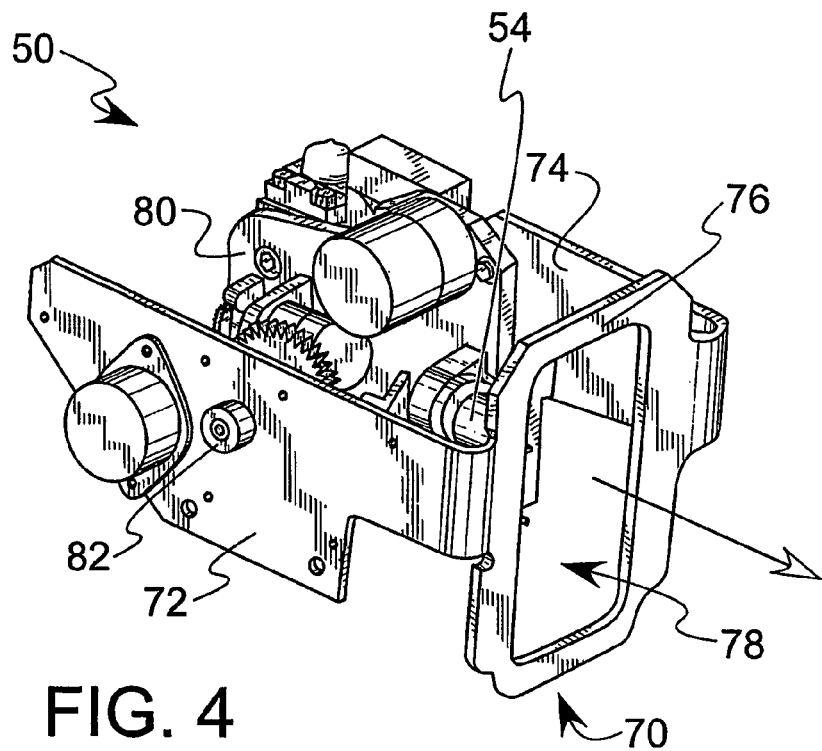
FIG. 4 is a perspective view of a portion of a laser assembly where a drive leveling device has oriented a collimated laser output in a first direction.
Figure 5:
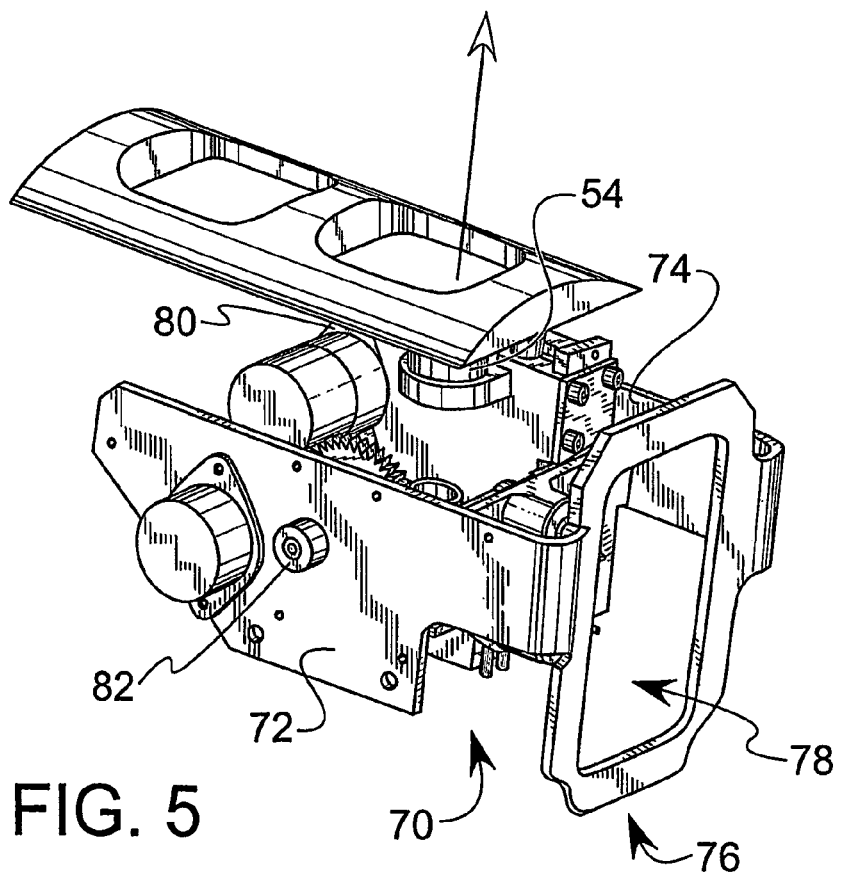
FIG. 5 is a perspective view of the laser assembly of FIG. 4 where the drive leveling device has oriented the collimated laser output in a second direction.

Referring to FIGS. 4 and 5, according to an embodiment of the present invention, at least a portion of the laser assembly 50 is secured to a frame 70. The frame 70 rigidly and fixedly mounts inside of the housing discussed with reference to FIGS. 1 and 2 herein. Of course, the frame 70 may be replaced with one or more internal surfaces of the housing, or any other rigid aspect of the laser transmitter that remains fixed with respect to the housing. As shown in FIG. 4, the frame 70 includes first and second support members 72, 74 in spaced relation to one another. The frame 70 may also comprise a third support member 76 having an optional frame aperture 78 therein.

The laser source 54 is secured by a holder 80, which is pivotably arranged between the first and second support members 72, 74 of the frame 70 by leveling points 82. The drive device 56 is operationally configured to pivot the holder 80 with respect to the frame 70 (and thus the housing) for aligning the laser source 54 to a desired location. For example, as shown in FIG. 4, the laser is aligned in a first position with respect to the frame 70 that is associated with the horizontal mode of operation. Referring to FIG. 5, the drive device 56 has pivoted the laser source 54 approximately 90 degrees to a second position associated with the vertical mode of operation.

Figure 6:
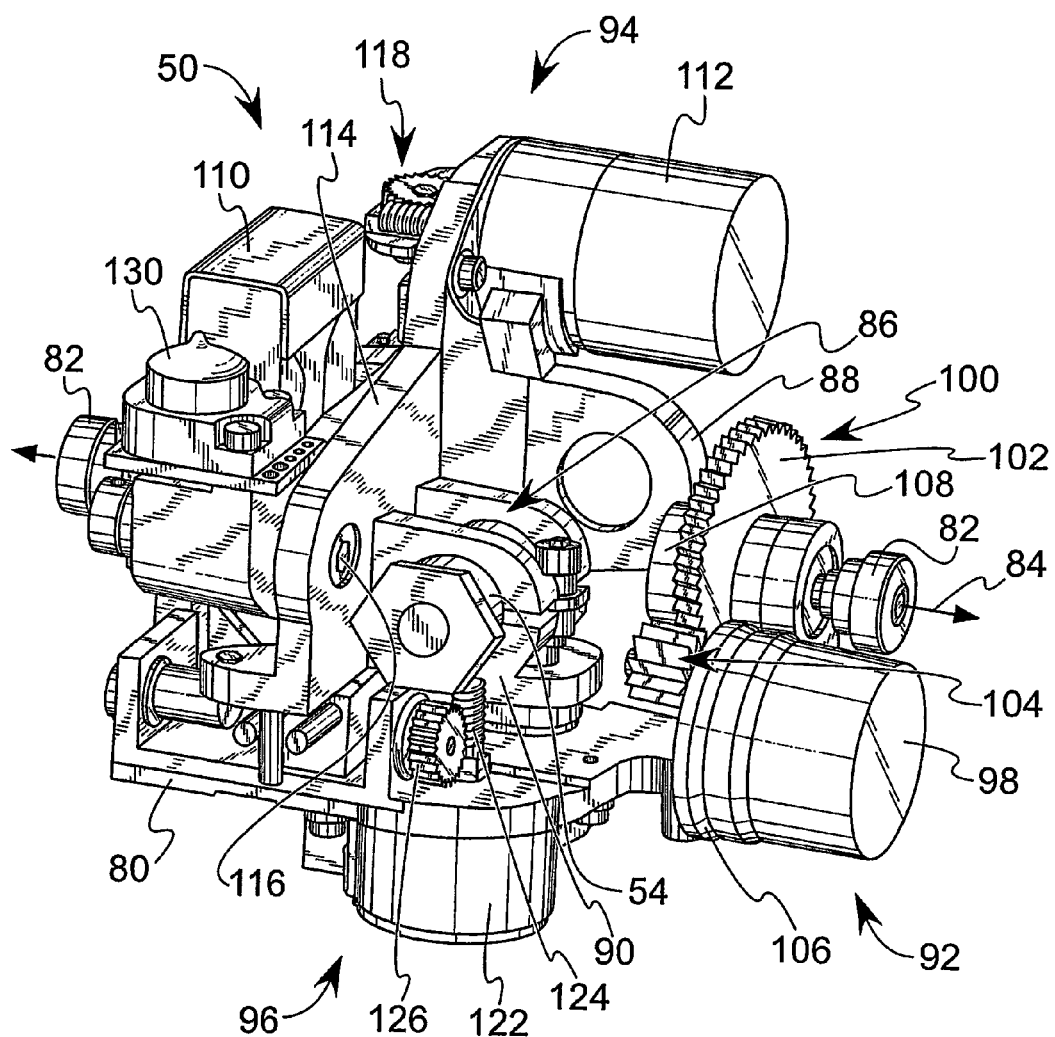
FIG. 6 is a perspective view illustrating an exemplary laser assembly according to an embodiment of the present invention.

Referring to FIG. 6, the holder 80 provides the necessary structure to support the various assemblies and subassemblies hereof. It should be noted that the frame 70 shown in FIGS. 4 and 5 has been removed for purposes of clarity. Two leveling points 82 are oriented on opposite sides of the laser assembly 50, and define a leveling axis 84 therebetween. Each of the two leveling points 82 is pivotably supported by an associated one of the first and second support members 72, 74 of the frame 70 discussed with reference to FIGS. 4 and 5.

The laser source 54 is positioned within a channel 86 of the holder 80. The channel 86 orients the output beam of the laser source 54 so that the beam is directed towards a laser aperture 88 in the holder 80. Preferably, the laser source 54 may be slid back and forth within the channel 86 until the laser source 54 is in the proper focus. Once the laser source 54 is suitably positioned, one or more clamps 90 secure the laser source in place. Any number of alternative clamping and focusing approaches may also be used, however. The laser beam preferably passes through or near the leveling axis 84 defined between the leveling points 82 and exits through the laser aperture 88 in the holder 80.

The laser assembly 80 further comprises three subassemblies that each serves a role in positioning the laser source 50. The first subassembly is a drive leveling subassembly 92 that serves to level the laser with respect to a predetermined plane of reference. For example, the drive leveling subassembly 92 typically adjusts the laser source 54 towards level with respect to a horizontal plane. The second subassembly comprises a tilt or grade adjustment subassembly 94 that provides tilt to the laser source 54 such that the reference beam of light can be transmitted at a predetermined grade. The third subassembly comprises a line control subassembly 96 that serves to rotate the laser source 54 to the right and left for repositioning the reference beam of light off axis.

According to an embodiment of the present invention, the laser source 54 is arranged to transmit the reference beam of light generally horizontally at a select grade irrespective of whether the housing of the laser is oriented substantially vertically or substantially horizontally. The ability of the laser transmitter to significantly re-orient the laser is accomplished using the drive leveling subassembly 92. The drive leveling subassembly 92 should preferably be able to re-orient the laser for operation over approximately 90 degrees of operation. According to an embodiment of the present invention, the drive leveling subassembly 92 is capable of operating over a 135 degree range. Of course, other operational ranges may be implemented. The drive leveling subassembly 92 comprises generally, a first drive device and a first leveling gear arrangement 100.

The first drive device 98 is used to provide the drive for leveling out the laser source 54 and can comprise for example, manual, motor or solenoid-driven systems. The first drive device 98 may comprise for example, a stepper motor that is preferably capable of precision step control suitable for fine position leveling. To accomplish such precision step control according to an embodiment of the present invention, the first drive device 98, implemented using a first stepper motor, is directly coupled to the first leveling gear arrangement 100. As shown, a first gear 102 is concentrically arranged along the pivoting axis 84 defined between the leveling points 82. The first gear 102 is meshed with a spur gear reducer 104. Depending upon the arrangement of the first drive device 98, an optional gear reduction box 106 may be required to interface the spur gear reducer 104 with the first drive device 98.

The gear reduction box 106 preferably cooperates with the spur gear reducer 104 and the step resolution of the first stepper motor 98 to provide level position control and an overall step resolution on the order of arcseconds or less. Because of the sensitivity and precision of the gears, a safety device may also be provided that prevents impact loading transfer from damaging the first leveling gear arrangement 100. For example, a slip clutch 108 can be coupled to the first gear 102. As the first stepper motor 98 sequentially steps through rotation of its shaft, the holder 80 is thus rotated with respect to the housing and frame (not shown in FIG. 6) about the leveling points 82 via the first leveling gear arrangement 100.

To properly orient the laser source 54, the drive level subassembly 92 cooperates with a null sensor 110, a bubble vial for example, to zero out the laser source 54. The drive leveling subassembly 92 is also optionally capable of autoleveling over a predetermined range. For example, according to an embodiment of the present invention, the drive leveling subassembly 92 is capable of autoleveling over a range of 200 arcseconds. Basically, the reference beam is maintained and controlled by the null sensor 110, by providing a controller (not shown in FIG. 6) with feedback of any deviations from level. Any deviation from level is then corrected by the first drive device 98, which drives the leveling gear arrangement 100 toward the level position indicted by the null sensor 110. Under this arrangement, a single laser is capable of being operated at different orientations that span 90 degrees or greater. For example, where the null sensor 110 is a bubble sensor, the bubble sensor knows that it is level, too high, or too low. The bubble sensor cannot tell you how far the level is too high or low however. The drive level subassembly 92 thus tries to follow the line of the bubble vial and continuously tries to hone towards a level position. Optionally, the drive leveling subassembly 92 can incorporate a course orientation switch to account for accuracy requirements for course as well as fine adjustments.

The tilt adjustment subassembly 94 allows the laser source 54 to operate at a select grade. As pointed out above, the null sensor 110 provides an output signal that indicates whether the level sensor is level. Essentially, a second drive device 112 drives the null sensor 110 to a user input grade position, and then the drive leveling subassembly 92 levels out the laser assembly 50 to the null sensor 110 thus orienting the reference beam to the selected grade.

A number of different arrangements can be incorporated for adjusting the tilt of the null sensor 110. For example, according to an embodiment of the present invention, a grade arm 114 supports the null sensor 110 such the null sensor 110 is pivotable about tilt point 116 with respect to the laser source 54. Briefly, the second drive device 112, a second stepper motor for example, drives a worm gear assembly 118 in response to a user input grade that is attached to a screw shaft. The threading on the screw determines the range of grade available. When the screw is turned, a nut traverses the shaft of the wormgear thus adjusting the grade.

Due to precise manufacturing tolerances, the gears of the worm gear assembly can be arranged to provide adjustments on the order of magnitude of arcseconds. As such, a lookup table or equivalent computation in the controller can be used to equate a desired grade adjustment with a number of gear teeth that corresponds to that grade. For example, each step of the second drive device 112 can be equated to approximately two arcseconds of angular motion. After the laser source is leveled, it is a simple matter to energize the tilt drive device to sequentially step through a rotation of the gears. Once the desired number of gear rotation increments has been counted out, then the tilt drive device is stopped. Basically, the second drive device 112 drives the null sensor 110 up or down to the desired grade. Next, the system auto levels, but because the second drive device 112 has tilted the null sensor 110 with respect to the laser source 54, when the drive leveling subassembly 92 levels the laser source 54 to the null sensor 110, the reference beam will be angled at the programmed grade. As such, the level and the grade adjustments can be made to be independent.

According to an embodiment of the invention, the line control subassembly 96 allows the reference beam to be adjustable to the left and right. Briefly, a third drive device 122, such as a third stepper motor, is configured to pivot the laser source 54 in a side to side motion. As shown, the third drive device 122, and optional gearbox, drive a worm gear 124 which meshes with one or more line cogs or line gears 126 to selectively pivot the laser source 54 to the left and to the right about a vertical post that allows the mechanism to pivot to the right or left with respect to the window. That is, once leveled, the laser can be directed right or left. In practice, a simple open-loop control system can be used to drive the laser source to the right and left. Accordingly, the system provides at least two degrees of freedom including the tilt and line.

The system may also optionally include a roll level sensor 130. The typical pipe has a curved bottom, which can cause the laser to become off balance. The roll level sensor 130 as illustrated in the example herein, does not provide leveling information directly. Rather, the roll level sensor 130 is configured as a switch that trips when the laser transmitter housing has become too far out of alignment to properly and accurately operate the laser. For example, when a laser transmitter is setting in a pipe, it is possible for the laser to become unstable and begin to roll around, or at a minimum, become out of alignment. According to an embodiment of the present invention, the roll level sensor is configured to sense whether the laser has been rotatively misaligned along its centerline axis to a magnitude that would not allow the laser to meet predetermined accuracy requirements. If the roll vial is triggered, for example, due to the laser rolling in a pipe, then an indication such as an audible, visual, or other perceptible signal is sent by the laser transmitter so that users know that the laser needs to be reset. For example, the roll level sensor may trigger the laser to blink, turn off, or give any other cue (audibly, visually etc) that the laser is out of alignment.

Figure 7:
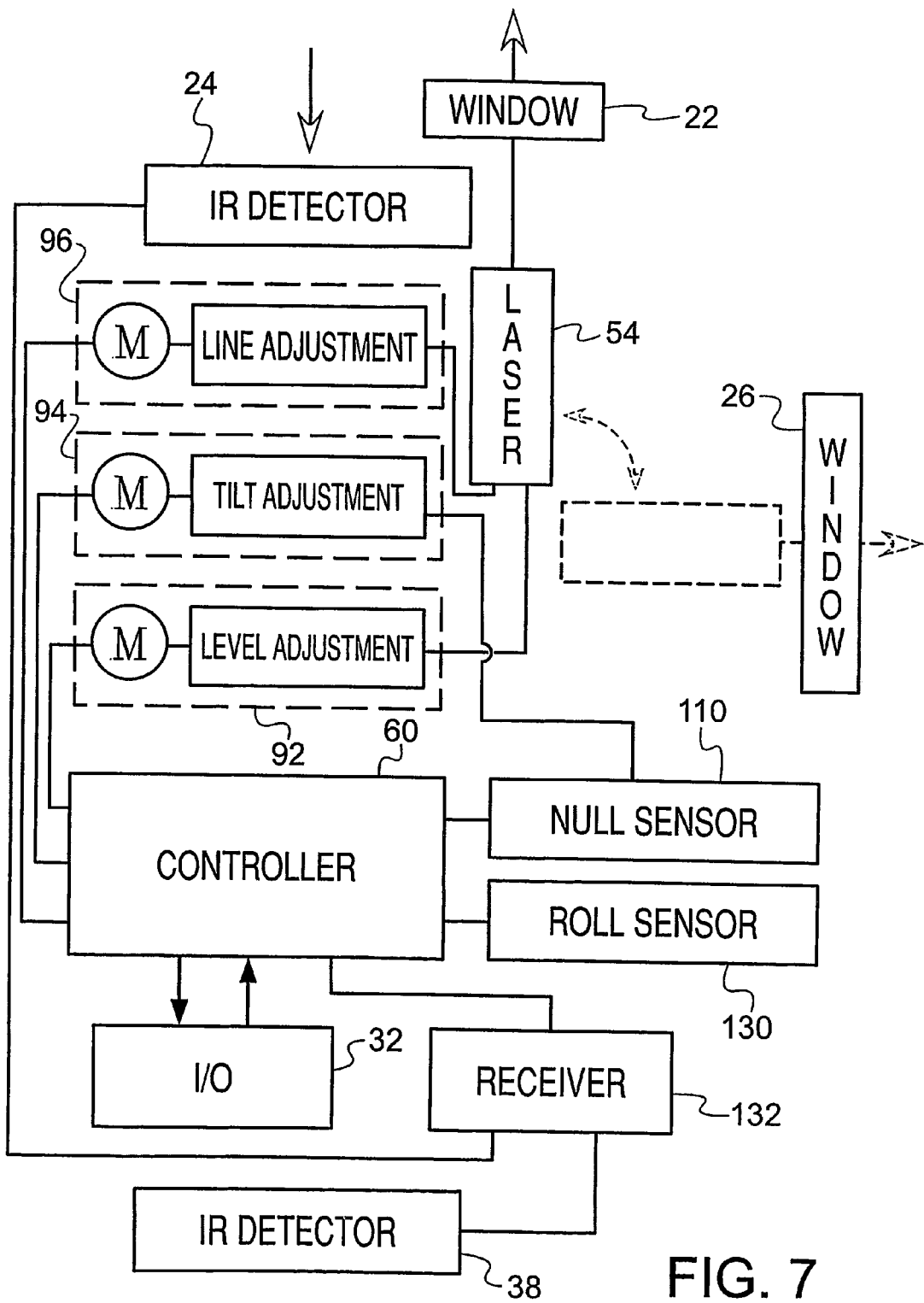
FIG. 7 is a block diagram of a drive leveling device for a laser transmitter according to an embodiment of the present invention.

Referring briefly to FIG. 7, a block diagram illustrates a system according to an embodiment of the present invention that can utilize the laser assembly 50 described with reference to FIGS. 4-6. Basically, the laser source 54 is adjusted by the drive leveling subassembly 92 and the line control subassembly 96. The grade adjustment subassembly 94 adjusts the laser source 54 indirectly by pivoting the null sensor 110. Initially, the controller 60 drives the laser source 54 to a generally horizontal direction. That is, if the housing of the laser transmitter is positioned vertically, the controller 60 will rotate the laser source to the first exit window 22. If the laser transmitter is oriented horizontally, the controller 60 will orient the laser source towards the second exit window 26. Next, if a grade has been established, the controller sets the grade adjustment subassembly 94 to the proper position. Grade can be entered either via the operational controls 32, or information may be transmitted to the controller 60 via the first or second communications windows and corresponding receiver(s) 132. Once the null sensor 110 is tilted to the appropriate grade, the autoleveling system zeros out the level Also, if a line adjustment has been input, either from the first or second communications windows or from the operational controls, the controller 60 directs the line adjustment subassembly 96 to rotate the laser source 54 to the desired position. If, during operation, the laser transmitter becomes unstable and rolls, or another major disturbance occurs, the roll sensor 130 trips informing the controller 60 to signal that an alignment problem has occurred.

Figure 8:
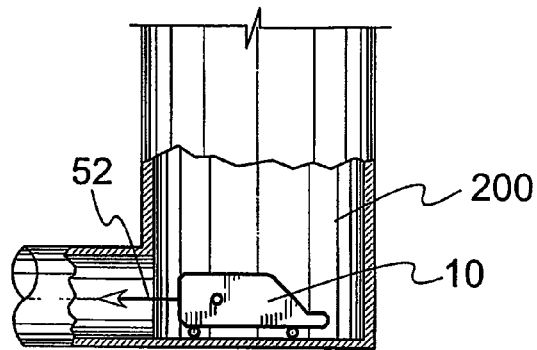
FIG. 8 is a schematic illustration of a laser transmitter according to an embodiment of the present invention in an exemplary application positioned generally horizontally within a manhole.
Figure 9:
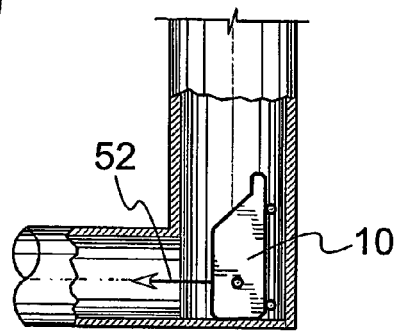
FIG. 9 is a schematic illustration of the laser transmitter of FIG. 6 in another exemplary application positioned generally vertically in a small clean-out manhole.
Figure 10:
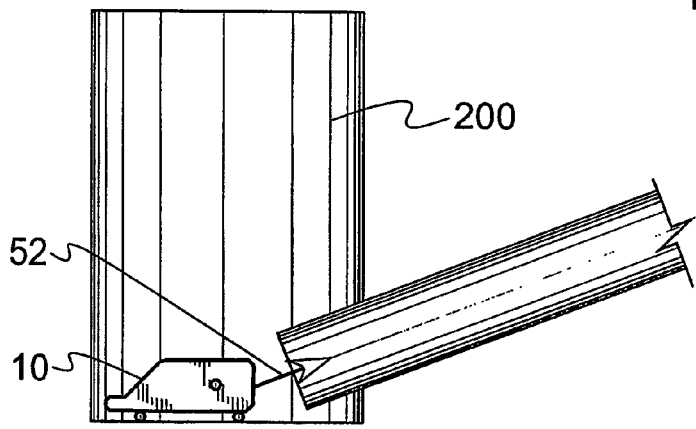
FIG. 10 is a schematic illustration of a laser transmitter according to an embodiment of the present invention in an exemplary application positioned generally horizontally within a manhole where a collimated beam is directed at a predefined grade in line with a pipe.

FIGS. 8-12 illustrate exemplary positioning of the laser transmitter according to various embodiments of the present invention in a typical application of laying sewer pipes. During pipe installation, the collimated laser output beam is directed along a centerline of the pipe and is used as a visual guide for both line (directional) and grade (inclination) measurements. Referring to FIG. 8, the laser transmitter is illustrated in the horizontal mode of operation. The laser transmitter 10 is positioned in a hub 200 that is sufficient in diameter to allow the laser transmitter 10 to be positioned horizontally. The reference beam 52 is set to a grade of zero. Referring to FIG. 9, the laser transmitter 10 is positioned in a clean out 202. As can be seen, the clean out 202 does not have a sufficient diameter to lay the laser transmitter 10 in horizontal mode. As such, the laser transmitter is oriented in vertical mode. FIG. 10 illustrates operation of the laser transmitter 10 in the horizontal mode at a predetermined grade. FIG. 11 illustrates positioning the laser transmitter 10 in a pipe 204 that itself is at a grade. FIG. 12 illustrates the laser transmitter 10 in a clean out 202. However as illustrated, the laser transmitter could not rest on a level surface. As such, a suspension mechanism 206 is used to stabilize the laser transmitter during operation.

Having described the invention in detail and by reference to preferred embodiments thereof, it will be apparent that modifications and variations are possible without departing from the scope of the invention defined in the appended claims.

The invention claimed is:

1. A laser transmitter comprising:
 a housing having a first laser exit window and a second laser exit window;
 a laser source configured to emit a non-rotating reference beam of light;
 a drive leveling device operatively configured to orient said reference beam to exit said housing only through a select one of said first and second laser exit windows; and
 a level sensor whose output signal is used to control said drive leveling device and select which one of said laser exit windows said reference beam will exit said housing.

2. The laser transmitter according to claim 1, wherein said first and second laser exit windows on said housing are oriented in substantially orthogonal planes.

3. The laser transmitter according to claim 1, wherein said drive leveling device can adjustably orient said reference beam across a range of at least 90 degrees.

4. The laser transmitter according to claim 1, wherein said drive leveling device can adjustably orient said reference beam across a range of at least 135 degrees.

5. The laser transmitter according to claim 1, wherein:
 said first laser exit window is positioned on said housing so as to allow said laser transmitter to be oriented in a generally horizontal position and direct said reference beam at a first select grade; and
 said second laser exit window is positioned on said housing so as to allow said laser transmitter to be oriented in a generally vertical position and direct said reference beam at a second select grade.

6. The laser transmitter according to claim 1, wherein said drive leveling device is configured to incrementally adjust said laser source to a level position in response to said output signal from said level sensor.

7. The laser transmitter according to claim 1, wherein said drive leveling device is configured to incrementally adjust said laser source to a level position in response to said output signal from said level sensor, said drive leveling device further comprising:
 a gear reducer coupled to a stepper motor;
 a spur gear reducer coupled to said gear reducer, said spur gear reducer is configured to fine tune a predetermined motor step of said stepper motor; and
 gearing coupled to said spur gear.

8. The laser transmitter according to claim 1, further comprising a motor and a slip clutch configured to prevent impact loading transfer to said drive leveling device from said motor.

9. The laser transmitter according to claim 1, wherein said drive leveling device is configured to fine tune level positioning in arcsecond level position resolution.

10. The laser transmitter according to claim 1, wherein said housing further comprises:
 a frame having first and second supporting members in spaced relation to one another;
 a holder pivotably arranged between said first and second supporting members, wherein said laser source is secured by said holder, and said drive device is operative to pivot said holder about said frame; and
 a controller configured to selectively operate said drive leveling device to pivot said laser source towards a predetermined desired grade based upon information from said level sensor.

11. The laser transmitter according to claim 1, further comprising a controller configured to selectively operate said drive leveling device based upon information from said level sensor.

12. The laser transmitter according to claim 1, further comprising a controller configured to selectively operate said drive leveling device based upon information from said level sensor and to pivot said laser source to a predetermined desired grade.

13. The laser transmitter according to claim 1, further comprising a controller configured to selectively operate said drive leveling device based upon information from said level sensor and to pivot said laser source to a predetermined desired grade, wherein said predetermined desired grade is set via said controller receiving a wireless communication.

14. The laser transmitter according to claim 1, further comprising a controller configured to selectively operate said drive leveling device to provide a line adjustment, a tilt adjustment, and a level adjustment to said reference beam.

15. The laser transmitter according to claim 1, wherein said laser source is adjustably repositionable to allow adjustment of focus of said reference beam.

16. The laser transmitter according to claim 1, wherein said drive device is configured to selectively pivot said laser source to provide a line adjustment, a tilt adjustment, and a level adjustment as selectively operated by a controller receiving said output signal as feedback, and signals from additional sensors as feedback.

17. The laser transmitter according to claim 1, wherein said laser assembly is configured to autolevel said reference beam to a predetermined desired grade.

18. The laser transmitter according to claim 1, further comprising operational controls and a controller responsive to said operational controls and configured to selectively operate said drive leveling device based upon information from said level sensor and to pivot said laser source to a predetermined desired grade, wherein said predetermined desired grade is set manually via said operational controls.

19. The laser transmitter according to claim 1, wherein said drive device comprises a first gear coupled to a shaft of a motor such that said first gear and said shaft rotate with unitary rotation motion, and a second gear fixedly secured about a first leveling point, said first and second gears meshed together such that rotation of said shaft of said motor causes unitary rotational motion of said first gear, which meshes with said second gear to pivot said laser source about said first leveling point; and wherein said laser transmitter further comprises a controller configured to selectively operate said drive leveling device to a desired grade adjustment equated with a corresponding number of gear teeth of said gears and said output signal from said level sensor as feedback.

20. The laser transmitter according to claim 1, further comprising a roll sensor configured to sense whether said laser source has been rotatively misaligned along its centerline axis to a magnitude that would not allow said reference beam to meet predetermined accuracy requirements.

21. The laser transmitter according to claim 1, wherein said laser transmitter is programmable to a select a desired grade of said reference beam.

22. A laser system comprising a laser transmitter according to claim 1, and a laser target configured to detect said reference beam.

* * * * *